Patented Aug. 4, 1931

1,817,363

UNITED STATES PATENT OFFICE

WILLIS A. GIBBONS, OF GREAT NECK, NEW YORK, ASSIGNOR TO MORGAN & WRIGHT, OF DETROIT, MICHIGAN, A CORPORATION OF MICHIGAN

METHOD OF TREATING UNVULCANIZED RUBBER SURFACES

No Drawing. Application filed October 14, 1927. Serial No. 226,260.

This invention relates to methods for preventing or controlling the surface stickiness of unvulcanized rubber stocks incident to their manufacture into articles.

In the manufacture of rubber goods and articles, particularly those requiring assembly from calendered or sheeted rubber, it has been necessary to separate the sheets or layers of rubber with fabric, paper or other liner during transport or delays incident to manufacture. It has also been the practice to treat the layers of rubber with some material which prevents the adhesion of the unvulcanized sheets prior to the fabrication of the completed article. The use of liners of various sorts has been for many purposes more or less of an expense, as the stock must be handled several times, and as the liners or books must also be handled. The majority of the materials applied to the surface of the rubber as lubricants or preventatives of adhesion are of a mineral nature, these being dusted on or applied as suspensions or emulsions. Such materials include soapstone, starches, and other powdered substances having similar properties. The use of such mineral products is attended by certain disadvantages notable among which are the tendency to adhere to the surface of the rubber, likelihood of causing discoloration during vulcanization, and interference with the adhesion of one layer of rubber to another when such adhesion is desired. It has also been proposed to employ metallic salts having a lubricating or tack-reducing nature, and having some property of being absorbed by the rubber at vulcanization temperature. However, these metallic salts may exert some influence upon the rate of vulcanization, particularly in the presence of powerful accelerators, and they frequently require a solvent other than water in order to apply them successfully as suspensions or solutions, either with or without water. Obviously the use of a solvent even in small quantities is not always desirable. Further the metallic salts are not freely soluble in the rubber except at the higher vulcanization temperatures, whereas for many manufacturing purposes it is particularly desirable to secure the utmost adhesion between plies at temperatures considerably below the vulcanizing temperatures. This is particularly true with rubber stocks which are compounded to vulcanize at temperatures not greatly in excess of 100° C.

The object of the present invention is to provide a method for reducing the tackiness of unvulcanized rubber surfaces during the various manufacturing stages, but at the same time possessing none of the disadvantages above mentioned. The invention also aims to provide a method for reducing the tackiness of unvulcanized rubber surfaces with a material which will not remain on the surface of the rubber at temperatures below those ordinarily employed in hot vulcanization, nor change the character of the rubber surface in any respect after vulcanization.

With a particular embodiment in mind but without intention to place limitations upon the scope of the invention beyond what may be required by the prior art, the invention briefly stated consists in treating unvulcanized rubber surfaces with a material which is decomposable at the vulcanization temperatures into portions which are volatile and rubber soluble respectively. The invention includes the use of materials which are completely volatile, as well as materials which are decomposed into constituents either volatile or soluble in the rubber or both.

As an illustration of a tackiness-reducing material which is decomposable at vulcanizing temperature, into a volatile portion and a portion readily soluble in rubber, I prefer to use such substances as the volatile salts of organic acids, particularly those acids which contain 8 or more carbon atoms. Ammonium stearate is one example. This material may be used in the following manner: A solution of 20 parts of ammonium stearate is made in 80 parts of water. This solution may be painted or otherwise applied to a freshly calendered rubber surface. Upon drying, a whitish film is left upon the surface of the rubber, and this film entirely prevents adhesion of the rubber to adjoining plies or sheets. Upon heating, assuming that the calendered sheets are to be plied, the ammonium stearate layer is decomposed, with the evolution of gaseous ammonia and leaving free stearic acid on the surface of the rubber. The stearic acid, however, is readily soluble in rubber at comparatively low temperatures, for example at 100° C., and quite rapidly soluble at higher temperatures. If the treated rubber be warmed for a few minutes at 100° C. it will be observed that the surface of the rubber is restored to its original brightness, showing that none of the material has remained on the surface.

With rubber stocks containing powerful accelerators which bring about vulcanization at low temperatures, the use of ammonium stearate as a surface lubricant is highly satisfactory, for the reason that complete solution of the stearic acid, and evolution of the ammonium base can be accomplished without heating the rubber in excess of the low temperatures at which vulcanization is intended to be accomplished.

Preferably the materials employed are completely soluble in water, although they may be colloidally soluble. Illustrations of other materials which are either completely volatile at vulcanization temperature or are decomposed into portions volatile at the vulcanization temperature and/or soluble in the rubber, are the volatile base compounds of the fatty acids, palmitic acid, oleic, and similar materials. It will be observed that none of these materials leave in the rubber or introduce into the rubber any substance which has a material effect upon the rate of vulcanization. None of the substances employed in the present invention change the surface characteristics of the rubber after they have been removed. Their use eliminates the necessity of providing liners or books for the storage or transportation of unvulcanized rubber sheets, and does not cause any deposit or caking in molds. There is practically no change in the color of a rubber stock which has been treated with the materials of the present invention, nor do they cause the finished surfaces to become dulled or dusty-looking.

Having thus described my invention, what I claim and desire to protect by Letters Patent is:

1. Method of reducing the tackiness of unvulcanized rubber surfaces which comprises treating the rubber surface with a tackiness-reducing compound which is decomposable at vulcanizing temperatures into portions at least one of which is volatile said tackiness reducing compound being capable of leaving substantially no deposit on the surface of the rubber at the termination of vulcanization.

2. Method of reducing the tackiness of unvulcanized rubber surfaces which comprises treating the rubber surface with a tackiness-reducing material which is decomposable at vulcanizing temperatures into a volatile portion and a remaining rubber soluble portion said tackiness reducing material being capable of leaving substantially no deposit on the surface of the rubber at the termination of vulcanization.

3. Method of reducing the tackiness of unvulcanized rubber surfaces which comprises treating the rubber surface with a solution of tackiness-reducing material containing a portion volatile at vulcanizing temperatures and a remaining portion soluble in the rubber at said temperatures said tackiness reducing material being capable of leaving substantially no deposit on the surface of the rubber at the termination of vulcanization.

4. Method of reducing the tackiness of unvulcanized rubber surfaces which comprises treating the rubber surface with a solution of a higher fatty acid salt of a base volatile at vulcanizing temperatures.

5. Method of reducing the tackiness of unvulcanized rubber surfaces which comprises treating the rubber surface with an ammonium salt of a higher fatty acid soluble in the rubber at vulcanizing temperature.

6. Method of reducing the tackiness of unvulcanized rubber surfaces which comprises coating the rubber surface with a water solution of an ammonium salt of a higher fatty acid.

7. Method of reducing the tackiness of unvulcanized rubber surfaces which comprises coating the rubber surface with a water solution of ammonium stearate.

Signed at New York, New York, this 4th, day of October, 1927.

WILLIS A. GIBBONS.